United States Patent
Orsino et al.

(10) Patent No.: US 11,791,972 B2
(45) Date of Patent: Oct. 17, 2023

(54) BANDWIDTH PART OPERATIONS FOR IDLE AND INACTIVE STATES

(71) Applicant: Telefonaktiebolaget LM Ericsson (publ), Stockholm (SE)

(72) Inventors: Antonino Orsino, Masala (FI); Mårten Ericson, Luleå (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 598 days.

(21) Appl. No.: 16/332,675

(22) PCT Filed: Feb. 8, 2019

(86) PCT No.: PCT/SE2019/050108
§ 371 (c)(1),
(2) Date: Mar. 12, 2019

(87) PCT Pub. No.: WO2019/160473
PCT Pub. Date: Aug. 22, 2019

(65) Prior Publication Data
US 2020/0119898 A1    Apr. 16, 2020

Related U.S. Application Data

(60) Provisional application No. 62/631,316, filed on Feb. 15, 2018.

(51) Int. Cl.
*H04L 5/00* (2006.01)
*H04B 17/336* (2015.01)
(Continued)

(52) U.S. Cl.
CPC ......... *H04L 5/0098* (2013.01); *H04B 17/336* (2015.01); *H04L 1/0026* (2013.01);
(Continued)

(58) Field of Classification Search
CPC ... H04L 5/0053; H04L 5/0092; H04L 5/0007; H04L 5/0048; H04L 5/0055;
(Continued)

(56) References Cited

U.S. PATENT DOCUMENTS

2018/0139778 A1    5/2018  Chou et al.
2019/0132862 A1*   5/2019  Jeon ..................... H04L 5/0087

FOREIGN PATENT DOCUMENTS

CN    102598772 A    7/2012
CN    103348621 A    10/2013
(Continued)

OTHER PUBLICATIONS

"Corrections on EN-DC", 3GPP TSG-RAN WG2Meeting #101; R2-180xxxx; Change Request 38.331 v.15.0.1; Athens, Greece, Feb. 26-Mar. 2, 2018, pp. 1-276.
(Continued)

*Primary Examiner* — Natasha W Cosme
(74) *Attorney, Agent, or Firm* — Murphy, Bilak & Homiller, PLLC

(57) ABSTRACT

According to an aspect, a wireless device is configured to selectively operate in one of two or more previously configured bandwidth parts (BWPs), each BWP being a different subset of an available bandwidth for uplink and/or downlink operation. The wireless device switches from an active RRC state to an inactive RRC state, and, after the switching, retains a physical layer configuration corresponding to the BWP active just prior to the switching.

26 Claims, 16 Drawing Sheets

(51) Int. Cl.
    *H04W 76/27* (2018.01)
    *H04L 1/00* (2006.01)
    *H04L 25/02* (2006.01)
    *H04W 24/10* (2009.01)
    *H04W 74/08* (2009.01)

(52) U.S. Cl.
    CPC .......... *H04L 5/0051* (2013.01); *H04L 5/0092* (2013.01); *H04L 25/0226* (2013.01); *H04W 24/10* (2013.01); *H04W 74/0833* (2013.01); *H04W 76/27* (2018.02)

(58) Field of Classification Search
    CPC ... H04L 5/0051; H04L 5/0094; H04L 1/1812; H04L 1/1614; H04L 1/1861; H04L 5/0098; H04L 1/1819; H04L 5/00; H04L 1/1854; H04L 5/005; H04L 5/10; H04L 1/0003; H04L 1/0026; H04L 1/0061; H04L 1/1887
    See application file for complete search history.

(56) References Cited

FOREIGN PATENT DOCUMENTS

| | | | |
|---|---|---|---|
| EP | 3753374 A1 | 12/2020 | |
| JP | 2021514131 A | 6/2021 | |
| KR | 20200111218 A | 9/2020 | |
| WO | 2017131046 A1 | 8/2017 | |
| WO | 2018016907 A1 | 1/2018 | |
| WO | WO-2019095222 A1 * | 5/2019 | ........ H04W 74/0833 |
| WO | 2019160473 A1 | 8/2019 | |

OTHER PUBLICATIONS

"Further Considerations for Bandwidth Part", 3GPP TSG-RAN WG2 NR #101 Meeting; R2-1802462; Athens, Greece, Feb. 26-Mar. 2, 2018, pp. 1-6.

3GPP, "3rd Generation Partnership Project; Technical Specification Group Radio Access Network; NR; Physical channels and modulation (Release 15)", 3GPP TS 38.211 V15.0.0, Dec. 2017, 1-73.

3GPP, "3rd Generation Partnership Project; Technical Specification Group Radio Access Network; NR; Physical layer procedures for control (Release 15)", 3GPP TS 38.213 V15.0.0, Dec. 2017, 1-56.

3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.

Unknown, Author, "Report of 3GPP TSG RAN2#AH-1801 meeting, Vancouver, Canada", 3GPP TSG-RAN WG2 meeting #101, R2-1801702, Athens, Greece, Feb. 26-Mar. 2, 2018.

Unknown, Author, "Control plane impacts for Bandwidth Parts", 3GPP TSG-RAN WG2 Meeting #99bis R2-1710457, Prague, Czech Republic, Oct. 9-13, 2017, 1-5.

3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, 1-959.

Unknown, Author , "Impacts of BWP for UE in Idle and Inactive", 3GPP TSG-RAN WG2 Ad hoc 0118 R2-1801377, Vancouver, Canada, Jan. 22-26, 2018, 1-4.

Unknown, Author , "RRC configuration framework for BWP", 3GPP TSG-RAN WG2 Meeting #AH1801 R2-1800445, Vancouver, Canada, Jan. 22-26, 2018, 1-14.

* cited by examiner

600

SEND, TO AT LEAST ONE WIRELESS DEVICE, AN INDICATION TO RETAIN, UPON SWITCHING FROM AN ACTIVE RRC STATE TO AN INACTIVE RRC STATE, A PHYSICAL LAYER CONFIGURATION CORRESPONDING TO A BWP IN USE BY THE WIRELESS DEVICE JUST PRIOR TO SAID SWITCHING
602

*FIG. 6*

BANDWIDTH PART OPERATIONS FOR IDLE AND INACTIVE STATES

TECHNICAL FIELD

The present disclosure generally relates to the field of wireless network communications, and more particularly, to wireless devices configured to selectively operate in one of two or more previously configured bandwidth parts (BWPs), each BWP being a different subset of an available bandwidth for uplink and/or downlink operation.

BACKGROUND

There is an ongoing discussion in the $3^{rd}$ Generation Partnership Project (3GPP) 5G standardization about the so-called bandwidth parts (BWPs). One reason for using BWPs are that some user equipments (UEs) might not be able to use the entire bandwidth, in which case they are assigned a smaller BWP that they are capable of handling. Another reason for using BWPs is to save battery power. A UE may be assigned a narrower BWP to reduce the needed energy.

So far, it has been agreed that each UE is assigned with at least an initial BWP (same for all UEs, with a narrow bandwidth enough for all UEs to be able to use it) and a default BWP. The default BWP may be the same as the initial BWP but may also be different (i.e., different UEs will typically have different default BWPs). In addition to initial and default BWPs, the UE can be configured with additional BWPs. It has been agreed that a UE can have up to four downlink/uplink BWPs. An important agreement is also that at any point in time, only one BWP is active for a specific UE. On deactivated BWPs, the UE does not monitor a physical downlink control channel (PDCCH) and does not transmit on a physical uplink control channel (PUCCH), physical random access channel (PRACH) and uplink shared channel (UL-SCH).

The UE is configured with BWPs using radio resource control (RRC) signaling (except the initial signal) and switching between BWPs is done by downlink control information (DCI) on a downlink physical control channel (DPCCH). There is also the possibility of switching to the default BWP when the bwp-InactivityTimer expires.

A configured BWP may have RACH resources, but there may also be BWPs without RACH resources, in which case the UE will perform random access on another BWP where there are RACH resources available. Also, for a physical uplink control channel (PUCCH), a BWP may or may not have a PUCCH configured. The reason for not having a PUCCH configured is that it occupies resources that will lead to overhead (especially in configured but not active BWPs). In the case where the UE is moved to a BWP without PUCCH, the consequence of not having a PUCCH configured in the active BWP is that the UE cannot send scheduling requests (SRs) or hybrid automatic repeat request (HARQ) feedback for downlink transmissions. The PUCCH is also used for channel quality indicators (CQIs) that cannot be transmitted without a PUCCH configured. Most probably, the network would need to reconfigure the BWP with a PUCCH also on the active BWP in case it was not configured from the start for performance reasons.

According to the 3GPP document 3GPP TS 38.331, V15.0.0 (December 2017), a BandwidthPart-Config information element (IE) is used to configure a bandwidth part, which is defined in 3GPP TS 38.211.

For each serving cell, the network configures at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

The bandwidth configuration is split into uplink and downlink parameters and into common and dedicated parameters. Common parameters (in UplinkBWP-Common and DownlinkBWPCommon) are "cell specific" and the network ensures the necessary alignment with corresponding parameters of other UEs. The common parameters of the initial bandwidth part of the PCell are also provided via system information. For all other serving cells, the network provides the common parameters via dedicated signaling.

One possibility for the contents of a BandwidthPart-config information element is as follows:

```
-- ASN1START
-- TAG-BANDWIDTH-PART-START
-- Generic parameters used in Uplink- and Downlink bandwidth parts
BWP ::=                          SEQUENCE {
    -- An identifier for this bandwidth part.
    -- Corresponds to L1 parameter 'UL-BWP-index'. (see 38.211, 38.213, section
12)
    bwp-Id                               BWP-Id.
    -- Frequency domain location and bandwidth of this bandwidth part defined
commonly in a table (FFS_Section). The location is given as
    -- distance (in number of PRBs) in relation to the lowest usable subcarrier
defined by the SCS-SpecificVirtualCarrier
        -- with the same subcarrier spacing as this BWP.
        -- Corresponds to L1 parameter 'DL-BWP-loc'. (see 38.211, section
FFS_Section).
        -- In case of TDD, a BWP-pair (UL BWP and DL BWP with the same bwp-Id)
must have the same location (see 38.211, section REF)
        -- FFS_Value: RAN1 seems to discuss the final range.
        locationAndBandwidth                 INTEGER (1..65536),
        -- Subcarrier spacing to be used in this BWP. It is applied to at least PDCCH,
PDSCH and corresponding DMRS.
        -- The values provided here are converted into a subcarrier spacing as
indicated in 38.211, Table 4.2-1.
        subcarrierSpacing                    ENUMERATED {n0, n1, n2, n3, n4, n5},
        -- Indicates whether to use the extended cyclic prefix for this bandwidth part.
If not set, the UE uses the normal cyclic prefix.
```

```
    -- Normal CP is supported for all numerologies and slot formats. Extended CP
is supported only for 60 kHz subcarrier spacing.
    -- (see 38.211, section 4.2.2)
        cyclicPrefix                            ENUMERATED { extended }
                                OPTIONAL
}
UplinkBWP ::=              SEQUENCE {
    -- An identifier for this bandwidth part. BWP ID=0 is used for the initial BWP
and may hence not be used here.
    -- Corresponds to L1 parameter 'UL-BWP-index'. (see 38.211, 38.213, section
12)
        bwp-Id                                  BWP-Id,
        bwp-Common                              UplinkBWP-Common
                                OPTIONAL,       -- Need M
        bwp-Dedicated                           UplinkBWP-Dedicated
                                OPTIONAL,       -- Need M
        ...
}
UplinkBWP-Common ::=       SEQUENCE {
        genericParameters                       BWP,
        -- FFS: Consider adding conditions for the following fields:
        rach-ConfigCommon                       SetupRelease { RACH-ConfigCommon }
                                OPTIONAL,       -- Need M
        pusch-ConfigCommon                      SetupRelease { PUSCH-ConfigCommon
}                               OPTIONAL,       -- Need M
        pucch-ConfigCommon                      SetupRelease { PUCCH-ConfigCommon
}                               OPTIONAL,       -- Need M
        ...
}
UplinkBWP-Dedicated ::=    SEQUENCE {
    -- PUCCH configuration for one BWP of the regular UL or SUL of a serving
cell. If the UE is configured with SUL, the network
    -- configures PUCCH only on one of the uplinks (UL or SUL).
        pucch-Config                            SetupRelease { PUCCH-Config }
                                OPTIONAL,       -- Need M
    -- PUSCH configuration for one BWP of the regular UL or SUL of a serving
cell. If the UE is configured with SUL and
    -- if it has a PUSCH-Config for both UL and SUL, a carrier indicator field in
DCI indicates for which of the two to use an UL grant.
    -- See also L1 parameter 'dynamicPUSCHSUL' (see 38.213, section
FFS_Section)
        pusch-Config                            SetupRelease { PUSCH-Config }
                                OPTIONAL,       -- Need M
    -- A Configured-Grant of typ1 or type2. It may be configured for Ul or SUL
but not for both at a time.
        configuredGrantConfig                   SetupRelease { ConfiguredGrantConfig }
                                OPTIONAL,       -- Need M
        srs-Config                              SetupRelease { SRS-Config }
                                OPTIONAL,       -- Need M
        ...
}
DownlinkBWP ::=            SEQUENCE {
    -- An identifier for this bandwidth part. BWP ID=0 is used for the initial BWP
and may hence not be used here.
    -- Corresponds to L1 parameter 'DL-BWP-index'. (see 38.211, 38.213, section
12)
        bwp-Id                                  BWP-Id,
        bwp-Common                              DownlinkBWP-Common
                                OPTIONAL,       -- Need M
        bwp-Dedicated                           DownlinkBWP-Dedicated
                                OPTIONAL,       -- Need M
        ...
}
DownlinkBWP-Common ::=     SEQUENCE {
        genericParameters                       BWP,
        pdcch-ConfigCommon                      SetupRelease { PDCCH-ConfigCommon
}                               OPTIONAL,       -- Need M
        ...
}
```

```
DownlinkBWP-Dedicated ::=      SEQUENCE {
    pdcch-Config                   SetupRelease { PDCCH-Config }
                    OPTIONAL,      -- Need M
    pdsch-Config                   SetupRelease { PDSCH-Config }
                    OPTIONAL,      -- Need M
    sps-Config                     SetupRelease { SPS-Config }
                    OPTIONAL,      -- Need M
    beamFailureDetectionConfig     SetupRelease {
BeamFailureDetectionConfig }              OPTIONAL, -- Need M
    ...
}
BWP-Id ::=                 INTEGER (0.. maxNrofBandwidthParts-1)
-- TAG-BANDWIDTH-PART-STOP
-- ASN1STOP
```

The following excerpt pertains to ongoing standardization of PWB operation for 3GPP and includes a preliminary specification for a ServingCellConfigCommon information element is shown, which may be used to configure cell-specific parameters of a UE's serving cell, including, for example, an initial downlink BWP, as well as a ServingCellConfig information element, which may be used to configure certain UE-specific parameters, such as an initial downlink BWP and/or a first active downlink BWP:

1.1.1.1 ServingCellConfigCommon

The ServingCellConfigCommon IE is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

ServingCellConfigCommon information element

```
-- ASN1START
-- TAG-SERVING-CELL-CONFIG-COMMON-START
ServingCellConfigCommon ::=        SEQUENCE {
    physCellId        PhysCellId           OPTIONAL, -- Cond HOAndServCellAdd,
    frequencyInfoDL   FrequencyInfoDL   OPTIONAL, -- Cond InterFreqHOAndServCellAdd
        -- The initial downlink BWP configuration for a SpCell (PCell of MCG or SCG).
        -- FFS: Discuss and then clarify in condition which serving cells have an initial BWP
    initialDownlinkBWP DownlinkBWP-Common   OPTIONAL, -- Cond FFS
        -- FFS: Possibly remove the condition on uplinkConfigCommon or replace by
"UL". Note that the entire ServingCellConfigCommon can
        -- only be sent when upon reconfiguration with sync and upon PSCell/SCell addition.
    uplinkConfigCommon        UplinkConfigCommon        OPTIONAL, -- Cond ReconfWithSyncAndSCellAdd
    supplementaryUplinkConfig UplinkConfigCommon        OPTIONAL, -- Cond SUL
        -- Subcarrier spacing for SIB1, Msg.2/4 for initial access and SI-messages
        -- Values 15, and 30 kHz are applicable for carrier frequencies <6GHz; Values
60 and 120 kHz are applicable for carrier frequencies >6GHz
        -- FFS: This must be one of the SCSs defined already inside FrequencyInfoDL.
Consider flagging one of those as "common" instead of this field.
    subcarrierSpacingCommon       SubcarrierSpacing,
        -- Indicates the time domain positions of the transmitted SS-blocks in an SS-burst.
        -- Corresponds to L1 parameter 'SSB-Transmitted' (see 38.213, section 4.1)
        -- FFS_CECHK: Is the NW required to provide always a valid bitmap? If not, we
cannot use "need M"
    ssb-PositionsInBurst      CHOICE {
        -- bitmap for sub 3 GHz
        shortBitmap      BIT STRING (SIZE (4)),
        -- bitmap for 3-6 GHz
        mediumBitmap     BIT STRING (SIZE (8)),
        -- bitmap for above 6 GHz
        longBitmap       BIT STRING (SIZE (64))
    }                                       OPTIONAL, -- Need M,
        -- The SSB periodicity in msec for the rate matching purpose (see 38.211, section
[7.4.3.1])
    ssb-periodicityServingCell        ENUMERATED { ms5, ms10, ms20, ms40, ms80,
ms160, spare2, spare1 }                       OPTIONAL,
        -- Position of (first) DL DM-RS (see 38.211, section 7.4.1.1.1)
    dmrs-TypeA-Position      ENUMERATED {pos2, pos3},
        -- Subcarrier spacing of SSB. Used only for non-initial access (e.g. SCells, PCell
of SCG).
```

-continued

| ServingCellConfigCommon information element |
|---|

```
    -- If the field is absent the UE shall assume the default value of the band.
    -- FFS in RAN1: Possibility to have several default values? May the field be
absent in that case?
    subcarrierSpacingSSB   SubcarrierSpacingSSB   OPTIONAL, -- Need S
    -- A cell-specific TDD UL/DL configuration.
    tdd-UL-DL-ConfigurationCommon       TDD-UL-DL-ConfigCommon OPTIONAL,
-- Cond TDD
    -- A second cell-specific TDD UL/DL configuration.
    -- FFS_CHECK: What does the UE do with two? Which one applies? A union of
both? If so, how?
    tdd-UL-DL-ConfigurationCommon2        TDD-UL-DL-ConfigCommon
OPTIONAL, -- Cond TDD
    -- TX power that the NW used for SSB transmission. The UE uses it to estimate the
RA preamble TX power.
    -- (see 38.213, section 7.4)
    ss-PBCH-BlockPower    INTEGER (-60..50)
    -- ================================================
    -- FFS which of the following are needed
    --
    -- bcch-Config    BCCH-Config,
    -- pcch-Config    PCCH-Config,
}
UplinkConfigCommon ::=     SEQUENCE {
    -- Absolute uplink frequency configuration and subcarrier specific virtual
carriers.
    frequencyInfoUL     FrequencyInfoUL       OPTIONAL, -- Cond
InterFreqHOAndUplinkSCellAdd
    -- The initial uplink BWP configuration for a SpCell (PCell of MCG or SCG).
Corresponds to L1 parameter 'initial-UL-BWP'.
    -- (see 38.331, section FFS_Section).
    -- FFS: Discuss and then clarify in condition which serving cells have an initial
BWP
    initialUplinkBWP     UplinkBWP-Common       OPTIONAL -- Cond
FFS
    }
-- TAG-SERVING-CELL-CONFIG-COMMON-STOP
-- ASN1STOP
```

TABLE 1

| Conditional Presence | Explanation |
|---|---|
| HOAndServCellAdd | This field is mandatory present for inter-cell handover and upon serving cell (PSCell/SCell) addition. Otherwise, the field is absent. |
| InterFreqHOAndServCellAdd | This field is mandatory present for inter-frequency inter-cell handover and upon serving cell (PSCell/SCell) addition. Otherwise, the field is absent. |

1.1.1.2—ServingCellConfig

The ServingCellConfig IE is used to configure (add or modify) the UE with a serving cell, which may be the SpCell or an SCell of an MCG or SCG. The parameters herein are mostly UE specific but partly also cell specific (e.g. in additionally configured bandwidth parts).

| ServingCellConfig information element |
|---|

```
-- ASN1START
-- TAG-SERVING-CELL-CONFIG-START
ServingCellConfig ::=   SEQUENCE {
    -- L1 parameters:
    tdd-UL-DL-ConfigurationDedicated TDD-UL-DL-ConfigDedicated
OPTIONAL, -- Cond TDD
    -- The dedicated (UE-specific) configuration for the initial downlink bandwidth-
part.
    -- FFS: Discuss and then clarify in condition which serving cells have an initial
BWP
```

| ServingCellConfig information element |
| --- |
|     initialDownlinkBWP      DownlinkBWP-Dedicated   OPTIONAL, --<br>Need M<br>    -- List of additional downlink bandwidth parts to be released. (see 38.211, 38.213,<br>section 12).<br>        downlinkBWP-ToReleaseList   SEQUENCE (SIZE (1..maxNrofBWPs)) OF<br>BWP-Id                    OPTIONAL, -- Need N<br>        -- List of additional downlink bandwidth parts to be added or modified. (see<br>38.211, 38.213, section 12).<br>      downlinkBWP-ToAddModList    SEQUENCE (SIZE (1..maxNrofBWPs)) OF<br>DownlinkBWP         OPTIONAL, -- Need N<br>    -- ID of the downlink bandwidth part to be used upon MAC-activation of an<br>SCell. If not provided, the UE uses the default BWP.<br>    -- The initial bandwidth part is referred to by BWP-Id = 0.<br>    firstActiveDownlinkBWP-Id       BWP-Id  OPTIONAL, -- Cond SCellOnly<br>    -- The duration in ms after which the UE falls back to the default Bandwidth Part.<br>(see 38.321, section 5.15)<br>    -- The value 0.5 ms is only applicable for carriers >6 GHz.<br>    -- FFS: RAN2 to discuss/confirm value range. RAN1 just suggested values from<br>1ms/0.5ms and up to about 50 ms.<br>    -- When the network releases the timer configuration, the UE stops the timer<br>without swithching to the default BWP.<br>    bwp-InactivityTimer     SetupRelease { ENUMERATED {<br>                             ms0dot5, ms1, ms2, ms3, ms4, ms5, ms6, ms8, ms10,<br>                             ms20, ms30, ms40, ms50, ms60, ms80, spare} }<br>OPTIONAL, -- Need M<br>      -- Corresponds to L1 parameter 'default-DL-BWP'. The initial bandwidth part is<br>referred to by BWP-Id = 0.<br>    -- ID of the downlink bandwidth part to be used upon expiry of txxx.<br>    -- This field is UE specific. When the field is absent the UE uses the the initial<br>BWP as default BWP.<br>    -- (see 38.211, 38.213, section 12 and 38.321, section 5.15)<br>    -- FFS: Whether to add a default uplink BWP<br>    defaultDownlinkBWP-Id       BWP-Id OPTIONAL, -- Need M<br>    uplinkConfig          UplinkConfig         OPTIONAL, -- Need M<br>    supplementaryUplink   UplinkConfig        OPTIONAL, -- Need M<br>    -- FFS in RAN1: Tracking Reference Signals configuration: TRS-Config?<br>    csi-MeasConfig       CSI-MeasConfig  OPTIONAL,<br>    -- MAC parameters:<br>    sCellDeactivationTimer        ENUMERATED (ms20, ms40, ms80, ms160,<br>ms200, ms240, ms320, ms400, ms480, ms520, ms640, ms720, ms840, ms1280,<br>spare2, spare 1}        OPTIONAL, -- Cond ServingCellWithoutPUCCH<br>    -- Indicates whether this SCell is cross-carrier scheduled by another serving cell.<br>    -- FFS: How to indicate whether CIF is present in the DCIs of the PCell? Should<br>the CrossCarrierSchedulingConfig be included<br>    -- and set to own so that the field "cif-Presence" can be set?<br>crossCarrierSchedulingConfig  CrossCarrierSchedulingConfig<br>OPTIONAL, -- Cond SCell<br>    -- Timing Advance Group ID, as specified in TS 38.321 [3], which this cell<br>belongs to.<br>    tag-id         TAG-Id,<br>    -- Enables the "UE beam lock junction (UBF)", which disable changes to the UE<br>beamforming configuration when in NR_RRC_CONNECTED.<br>    -- FFS: Parameter added preliminary based on RAN4 LS in R4-1711823. Decide<br>where to place it (maybe ServingCellConfigCommon or<br>    -- in a BeamManagement IE??)<br>    ue-BeamLockFunction      ENUMERATED {enabled} OPTIONAL,<br>    -- Indicates whether UE shall apply as pathloss reference either the downlink of<br>PCell or of SCell that corresponds with this uplink<br>    -- (see 38.213, section 7)<br>    pathlossReferenceLinking    ENUMERATED {pCell, sCell} OPTIONAL --<br>Cond SCell<br>}<br>UplinkConfig ::=      SEQUENCE {<br>    -- The dedicated (UE-specific) configuration for the initial uplink bandwidth-part.<br>    -- FFS: Discuss and then clarify in condition which serving cells have an initial<br>BWP<br>    initialUplinkBWP      UplinkBWP-Dedicated  OPTIONAL, -- Need<br>M<br>    -- The additional bandwidth parts for uplink. In case of TDD uplink- and downlink<br>BWP with the same bandwidthPartId are considered<br>    -- as a BWP pair and must have the same center frequency.<br>    uplinkBWP-ToReleaseList       SEQUENCE (SIZE (1..maxNrofBWPs)) OF<br>BWP-Id |

-continued

| ServingCellConfig information element |
|---|
|         OPTIONAL, -- Need N<br>    uplinkBWP-ToAddModList SEQUENCE (SIZE (1..maxNrofBWPs)) OF<br>UplinkBWP           OPTIONAL, -- Need N<br>    -- ID of the uplink bandwidth part to be used upon MAC-activation of an SCell. If<br>not provided, the UE uses the FFS: default BWP.<br>      -- The initial bandwidth part is referred to by BandiwdthPartId = 0.<br>      firstActiveUplinkBWP-Id       BWP-Id       OPTIONAL -- Cond<br>SCellOnly<br>}<br>-- TAG-SERVING-CELL-CONFIG-STOP<br>-- ASN1STOP |

A problem with the solution defined as of version 15.0.0 of 3GPP TS 38.211 and version 15.0.0 of 3GPP TS 38.331 is that each time the UE enters either an Idle or Inactive state, the UE discards the dedicated BWP configurations. This means that all BWP configurations sent via the RRC signaling to the UE will be discarded.

SUMMARY

Embodiments of the present invention address this problem. When the UE enters a Connected state again, it will use the initial BWP for accessing the network and receiving the dedicated RRC BWP configuration once more. Since the transition from Connected to Idle/Inactive and Idle/Inactive to Connected may be quite frequent, the overhead of transmitting the dedicated BWP configurations via RRC may be rather high. An advantage of the embodiments is that the dedicated BWP configuration signaling may be avoided each time the UE re-enters Connected mode.

According to some embodiments, a method, in a wireless device (e.g., UE) configured to selectively operate in one of two or more previously configured BWPs, where each BWP is a different subset of an available bandwidth for uplink and/or downlink operation, includes switching from an active RRC state to an inactive RRC state and, after said switching, retaining a physical layer configuration corresponding to the BWP active just prior to said switching.

According to some embodiments, a method in a network node serving a wireless device configured to selectively operate in one of two or more previously configured BWPs, where each BWP is a different subset of an available bandwidth for uplink and/or downlink operation, includes sending, to at least one wireless device, an indication to retain, upon switching from an active RRC state to an inactive RRC state, a physical layer configuration corresponding to a BWP in use by the wireless device just prior to said switching.

According to some embodiments, a wireless device configured to selectively operate in one of two or more previously configured BWPs, each BWP being a different subset of an available bandwidth for uplink and/or downlink operation, includes transceiver circuitry configured for communicating with a network node of a wireless communication network and processing circuitry operatively associated with the transceiver circuitry. The processing circuitry is configured to switch from an active RRC state to an inactive RRC state, and after said switching, retain a physical layer configuration corresponding to the BWP active just prior to said switching.

According to some embodiments, a network node configured to serve a wireless device configured to selectively operate in one of two or more previously configured BWPs, where each BWP is a different subset of an available bandwidth for uplink and/or downlink operation, includes transceiver circuitry configured for communicating with the wireless device and processing circuitry operatively associated with the transceiver circuitry. The processing circuitry is configured to send, to at least one wireless device, an indication to retain, upon switching from an active RRC state to an inactive RRC state, a physical layer configuration corresponding to a BWP in use by the wireless device just prior to said switching.

Further aspects of the present invention are directed to an apparatus, wireless device, network node, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 6 illustrates a flow diagram of a method in the network node, according to some embodiments.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

In RAN2 AH1801, the following agreements regarding BWP were made:
Agreements for PCell and PSCell (applicability to SCells depends on offline on BWP signalling structure)
1: RAN2 understand that the SSB of the cell where Idle/inactive UE camps is the cell defining SSB.
2 In idle/inactive states, system information provides the UE with a common configuration that corresponds to the Initial DL and UL BWP (and no other BWPs).
FFS Whether the Initial BWP provided in SI and the Initial BWP provided in dedicated signalling are defined as 2 types to simply the specification. Stage 3 issue.
  2i Common and dedicated configuration of the Initial BWP can be provided in RRC connected state. Common configuration is only provided at synchronous reconfiguration.
  2ii Other BWPs can only be configured in RRC connected.
3 Idle/inactive UE monitors system information and paging information in the initial DL BWP.
4 Idle/inactive UE performs random access in the initial UL/DL BWP.
5 Initial BWP configuration as provided in system information should be the same as the common configuration of the Initial BWP configuration provided in RRC connected provided at synchronous reconfiguration.
6 Upon transition to the idle state, UE releases all dedicated BWP configurations (and therefore UE applies the initial BWP configuration from system information of the cell where the UE is camped).
7 Upon transition to the inactive state, UE applies the initial BWP configuration from system information of the cell where the UE is camped.
8 BWPs have no specification impact to cell selection and reselection. Cell selection and reselection is based on SSB.
FFS Whether any PHY layer configuration are kept while the UE is in Inactive Under these agreements, it is not clear whether the dedicated BWP configuration is kept when the UE makes a transition to inactive. If the UE enters Idle it is clear all dedicated BWP configurations are discarded, as shown in FIG. 1.

Figure 1:
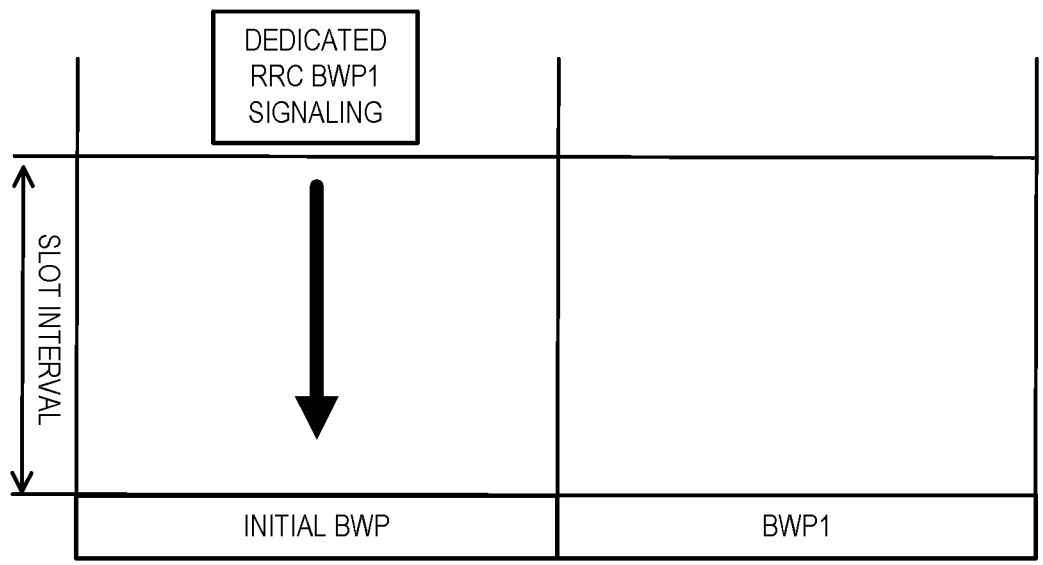
FIG. 1 illustrates UE behavior when the UE makes a transition to Idle/Inactive.
Figure 1:
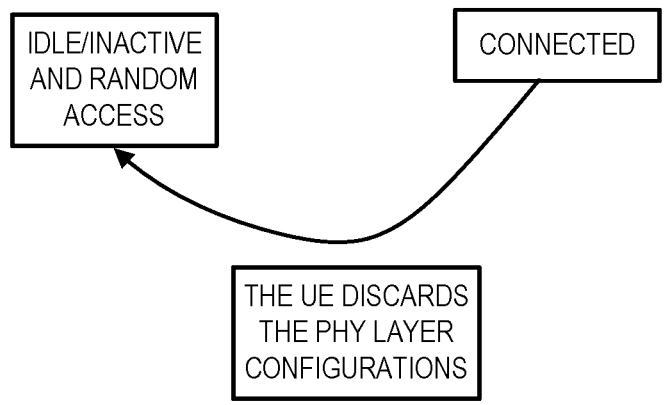

FIG. 1 illustrates a schematic picture of UE behavior when the UE makes a transition to Idle/Inactive.

The following sections describe embodiments for the Inactive case. It should be noted that these solutions can also be applied to the case when the UE enters the Idle state and then reconnects to the Connected state.

Embodiment 1

According to a first approach, the UE keeps the current dedicated BWP configuration when entering into an Inactive state. With such a solution, the need for dedicated RRC BWP configuration signaling may be decreased or completely avoided when the UE re-enters Connected mode again (i.e., see FIG. 2). Note that when the UE enters into the Inactive state, the network can still release the resources for a subset of PHY layer configurations for the UE (see BWP1 in FIG. 2). For example, configured PUCCH and channel state information reference signal (CSI-RS) resources, synchronization reference signal (SRS) reporting, or teardown indication (TCI)-states can be released, and the resources used for such procedures can be used by another UE still active in BWP1.

Figure 2:
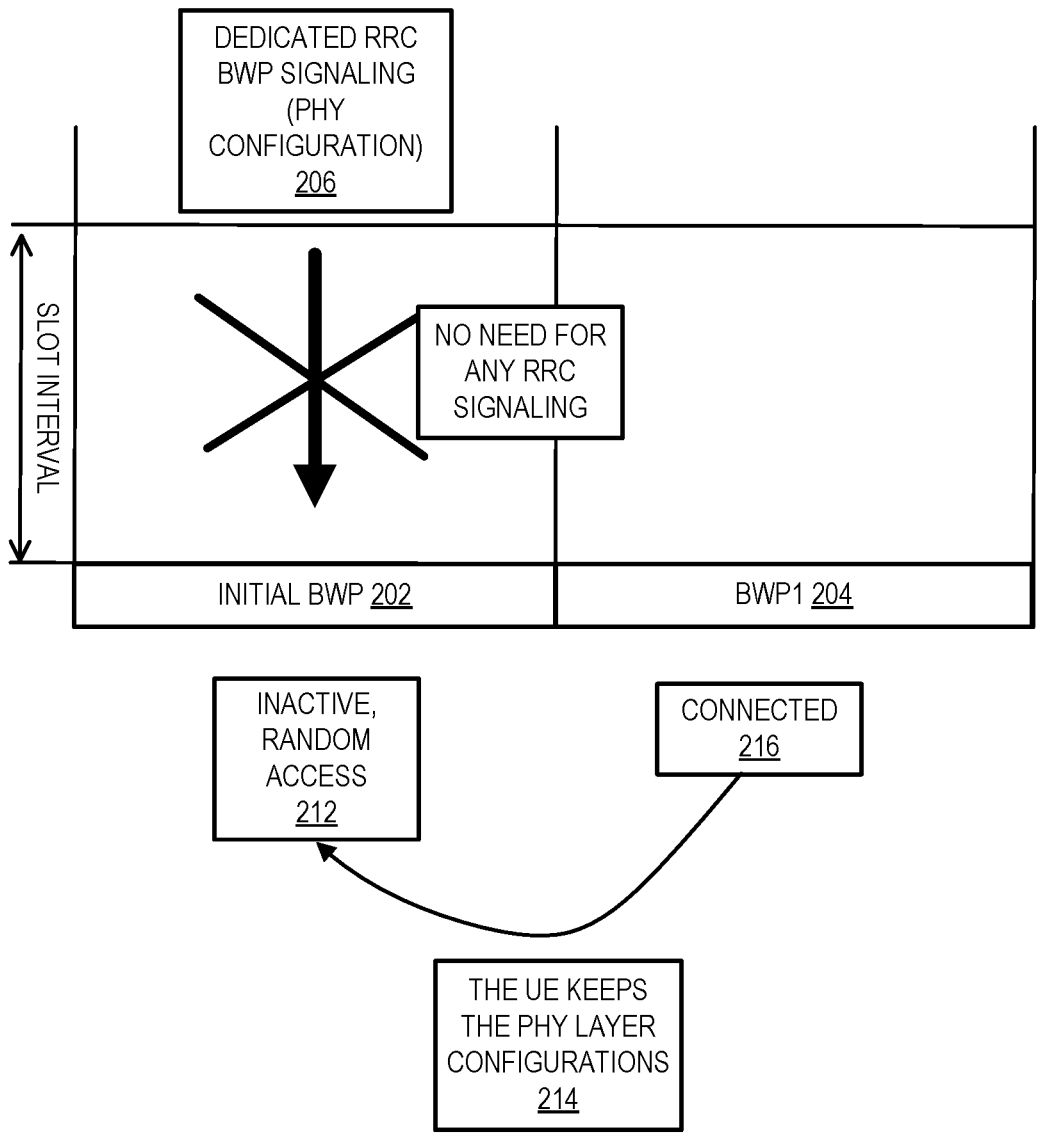
FIG. 2 illustrates UE behavior, according to some embodiments.

FIG. 2 illustrates a first embodiment with an initial bandwidth part 202 and bandwidth part 1 204. If the dedicated BWP configurations 206 have changed, the network must update the UE with the new dedicated BWP configurations via RRC, at least for the changed part of the configuration. Accordingly, the UE shall keep or retain the dedicated BWP configurations when it enters into an Inactive state 212 and the network can assume that the UE has the same BWP configurations as before entering the Inactive state 212.

In a further embodiment, the network signals to the UE during the transition to an Inactive state 212 to keep the dedicated BWP configurations 214 or a subset of these.

In yet another embodiment, when the UE re-enters into Connected mode 216 again, the network transmits only the new dedicated BWP configurations via RRC (overriding the old ones) entirely or by means of a delta signaling, which means overriding only the changed ones.

Embodiment 2

Figure 3:
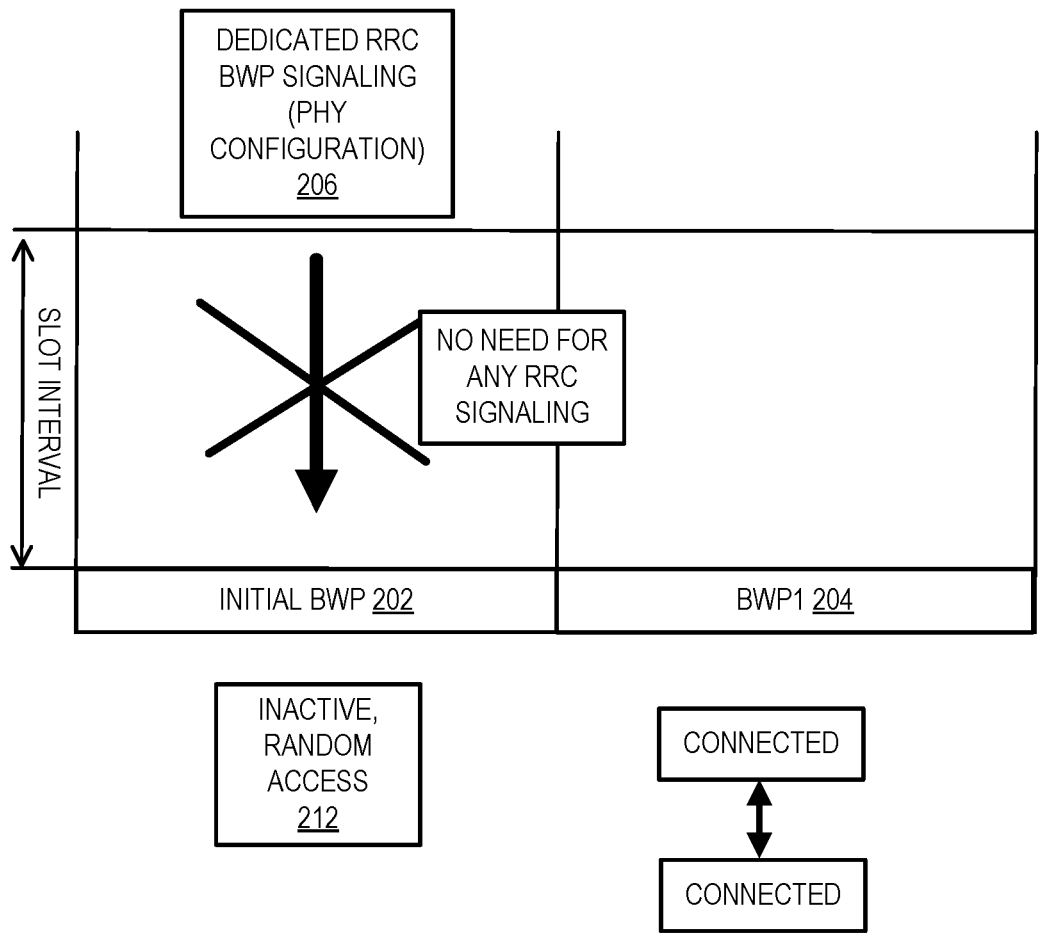
FIG. 3 illustrates UE behavior, according to some embodiments.

A further optimization of the solution, according to an embodiment, is that when the UE enters Inactive 212 it will also continue to monitor BWP1 204 (earlier active BWP), listen to the system information and paging from BWP1 204, and also make random access in BWP1 204. In other words, BWP1 204 can be used as a default BWP and/or an initial BWP. This removes the need for a switch to and from initial BWP 202, see FIG. 3. If the random access fails, the UE switches automatically to initial BWP 202 and discards the dedicated BWP configurations.

Embodiment 3

A possible problem is that after the UE enters Inactive 212, it might move and change cells, as in a handover. The normal procedure is then, as usual, to read the system information (SI) and get the initial BWP configuration and make a random access on the initial BWP. Thereafter, the UE can receive dedicated BWP configurations via RRC.

Figure 4:
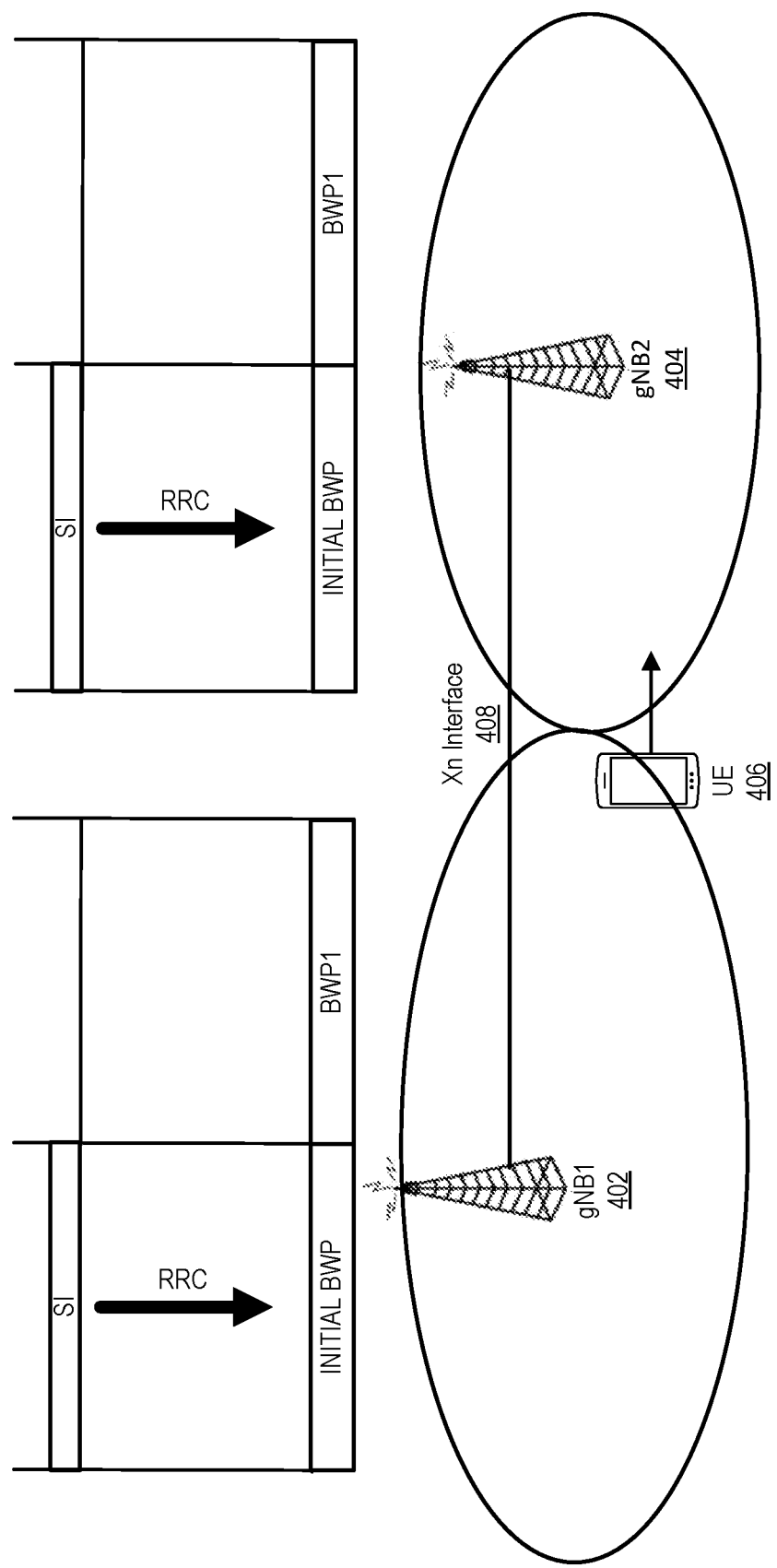
FIG. 4 illustrates UE behavior in a handover case, according to some embodiments.

In this case of a handover, as illustrated by FIG. 4, it is likely that the BWP configurations for adjacent cells are the same, since the cell properties are probably the same (e.g., same frequencies, same capabilities etc.). A solution to avoid sending the dedicated BWP configurations via RRC when the UE has changed its cell is then as follows. The source node sends the dedicated BWP configuration to the new cell via the Xn interface 408. Assuming the example in FIG. 4, the dedicated BWP configuration is sent from the source gNB1 402 to the target gNB2 404 when the UE 406 changes its cell to gNB2 404.

If the BWP configuration is the same for both cells, then either: 1) the target node 404 indicates whether this is still valid or not (the source node 402 can then indicate to the UE 406 to keep the latest BWP configuration or not); or 2) the target node 404 directly indicates to the UE 406 to keep the latest BWP configuration.

Embodiment 4

In another embodiment, the UE may use the stored dedicated configurations conditionally based on: an RRC suspend (or similar RRC message) indication of whether to keep the dedicated BWP configuration or not (in some cases, the network may ask UE to keep the all/subset of configurations for all/subset of BWPs); the SI indicates a change in BWP related configuration; and/or the SI information of the current cell (the UE is camped on) is different than the SI information of the cell that the UE is configured with (regarding the BWP related information).

Even though the previous embodiment suggests a more optimized solution, the UE may also assume that the stored BWP configuration is invalid and can be released if the cell or the node the UE is camped on changes.

General Remarks:

The UE can be configured with dedicated BWP configurations by means RRC connection setup, RRC (connection) reconfiguration or RRC (connection) resume or similar messages. RRC (connection) suspend or release messages can explicitly indicate whether to keep BWP configurations such as physical layer configurations, or implicitly the message itself can indicate whether the physical layer configuration is kept. For example, when an RRC suspend message is sent, the UE always keeps the BWP configuration.

Even though the embodiments refer to the dedicated configurations, the stored information may also be common configurations (additionally or solely), and in some cases, the common configuration stored may override the common configuration broadcast by the SI.

The terminology used herein is for describing the embodiments and may change or be different in the technology specifications or implementations. In some cases, the default BWP and initial BWP can be replaced. RAN1 defines default BWP (downlink only) for power saving purpose and agreed that the default BWP can be different from the initial downlink BWP, and the DL default BWP may not contain a synchronization signal block (SSB). The default BWP can be UE specific and different UEs can be configured with different default BWP according to their services and capabilities. However, the initial downlink/uplink BWPs are common for different UEs configured with the same cell defining SSB.

In some cases, the stored configuration could be for all BWPs or a subset of BWPs. It may include the default BWP and/or the initial BWP configuration, or it may not. Various embodiments can be applied in the downlink only, the uplink only, or both.

Upon entering an Inactive state, the dedicated BWP configuration is kept, and when the UE re-enters in Connected mode, it re-applies the dedicated BWP configurations even though no dedicated BWP configurations are transmitted from the network.

In further embodiments, the network signals to the UE during the transition to the Inactive state to keep the dedicated BWP configurations.

In yet another embodiment, when the UE re-enters Connected mode again, the network transmits parts of the new dedicated BWP configurations via RRC (partly overriding the old BWP configuration).

In yet another embodiment, when the UE enters the Inactive state, it will also continue to monitor the BWP1 and listen to the system information and paging from the active BWP (not initial BWP) and when the UE re-enters Connected mode, the UE will try to make a random access in the dedicated BWP.

Figure 5:
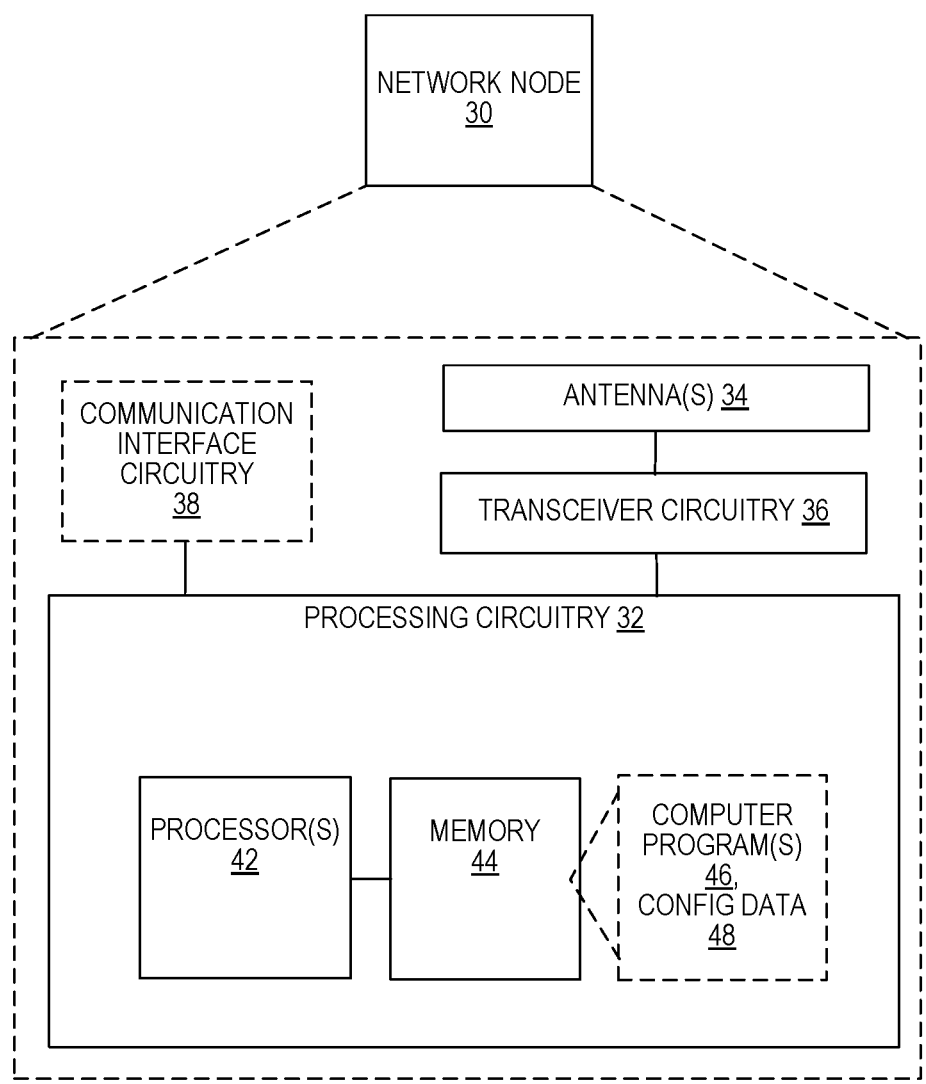
FIG. 5 illustrates a block diagram of a network node, according to some embodiments.

FIG. 5 shows a network node 30, such as a base station, which may be configured to carry out one or more of these disclosed techniques. The base station may be an evolved Node B (eNodeB), Node B or gNB. These operations can be performed by other kinds of network nodes or relay nodes. In the non-limiting embodiments described below, the network node 30 will be described as being configured to operate as a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include communication interface circuitry 38 that includes circuitry for communicating with other nodes in the core network, radio nodes, and/or other types of nodes in the network for the purposes of providing data and/or cellular communication services. The network node 30 communicates with wireless devices using antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuitry 36 and, in some cases, the communication interface circuitry 38. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuitry 32 and/or separate from the processing circuitry 32. The memory 44 may also store any configuration data 48 used by the network access node 30. The processing circuitry 32 may be configured, e.g., through the use of appropriate program code stored in memory 44, to carry out one or more of the methods and/or signaling processes detailed hereinafter.

The processing circuitry 32 of the network node 30 is configured, according to some embodiments, to serve a wireless device configured to selectively operate in one of two or more previously configured BWPs, where each BWP being a different subset of an available bandwidth for uplink and/or downlink operation. The processing circuitry 32 of the network node 30 is configured to send, to at least one wireless device, an indication to retain, upon switching from an active RRC state to an inactive RRC state, a physical layer configuration corresponding to a BWP in use by the wireless device just prior to said switching.

The processing circuitry 32 of the network node 30 may also be configured to perform a corresponding method 600, as shown in FIG. 6. The method 600 includes sending, to at least one wireless device, an indication to retain, upon switching from an active RRC state to an inactive RRC state, a physical layer configuration corresponding to a BWP in use by the wireless device just prior to said switching (block 602). The sending may be performed in conjunction with transitioning the wireless device to the inactive RRC state. The sending may be via broadcasted SI.

The method 600 may further include sending to the wireless device, after said sending the indication to retain, one or more updates to the physical layer configuration corresponding to the BWP in use by the wireless device just prior to said switching.

Figure 7:
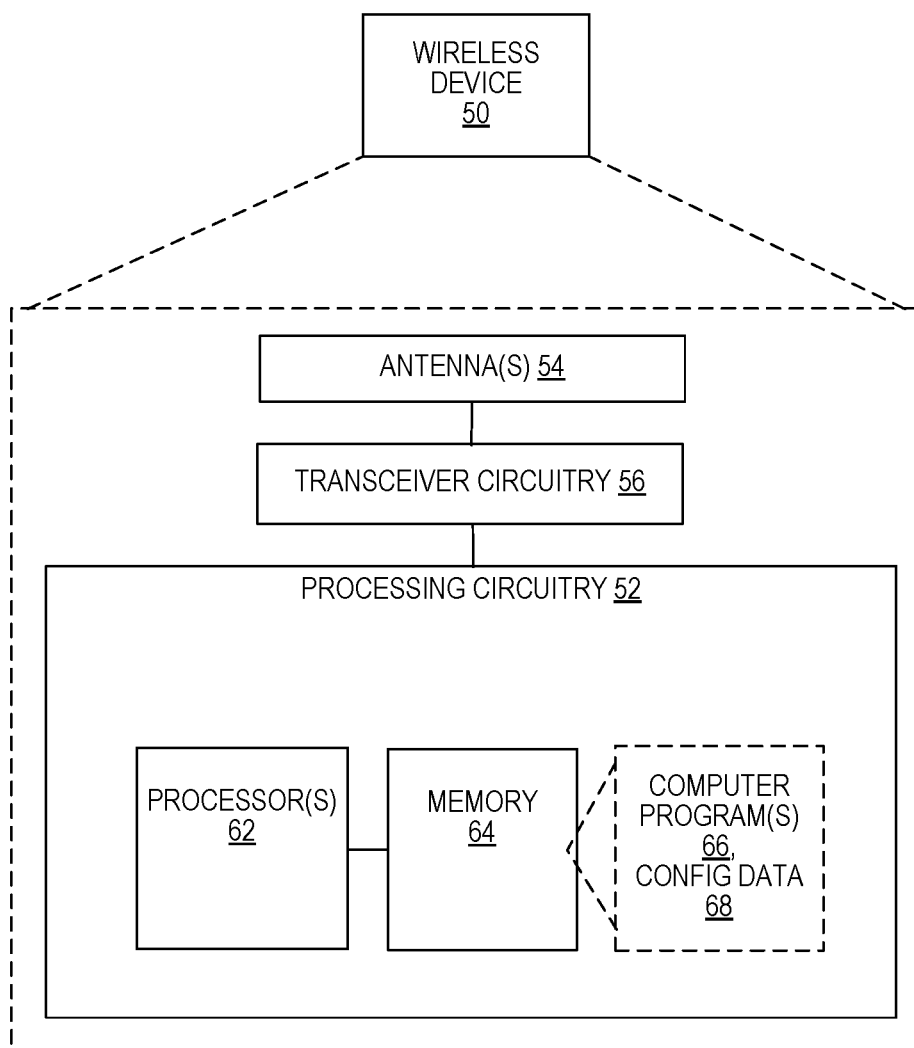
FIG. 7 illustrates a block diagram of a wireless device, according to some embodiments.

FIG. 7 illustrates a diagram of a wireless device, shown as wireless device 50, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio network node or base station in a wide-area cellular network via antennas 54 and transceiver circuitry 56. The transceiver circuitry 56 may include transmitter circuits, receiver circuits, and associated control circuits that are collectively configured to transmit and receive signals according to a radio access technology, for the purposes of using cellular communication services. This radio access technologies are NR and LTE for the purposes of this discussion.

The wireless device 50 also includes one or more processing circuits 52 that are operatively associated with the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50. The processing circuitry 52 may be configured, e.g., through the use of appropriate program code stored in memory 64, to carry out one or more of the methods and/or signaling processes detailed hereinafter.

The processing circuitry 52 of the wireless device 50 is configured, according to some embodiments, to selectively operate in one of two or more previously configured BWPs, where each BWP being a different subset of an available bandwidth for uplink and/or downlink operation. The processing circuitry 52 is configured to switch from an active RRC state to an inactive RRC state, and after said switching, retain a physical layer configuration corresponding to the BWP active just prior to said switching.

Figure 8:
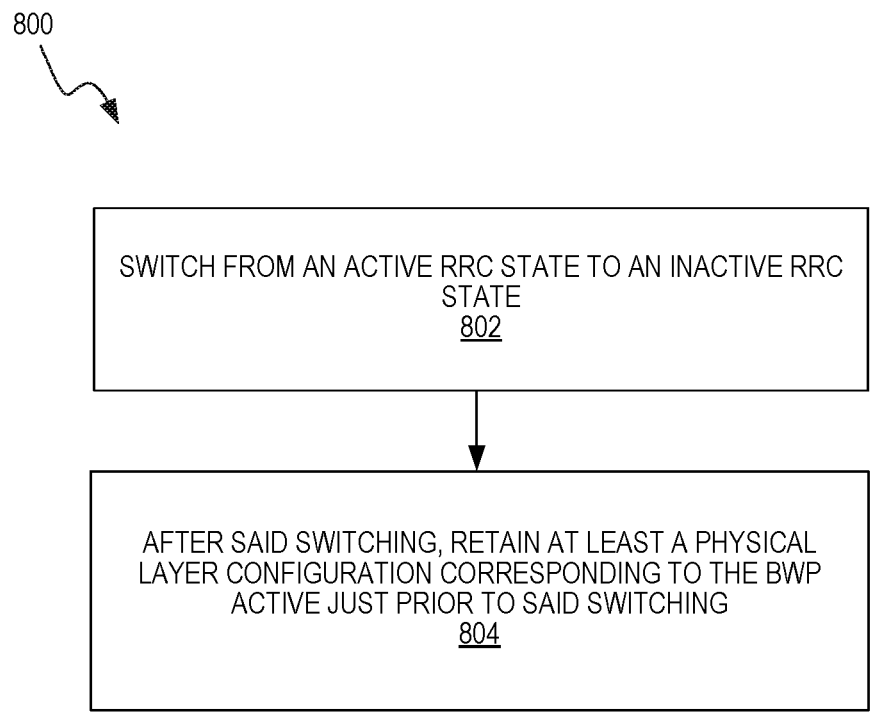
FIG. 8 illustrates a flow diagram of a method in the wireless device, according to some embodiments.

According to some embodiments, the processing circuitry 52 is configured to perform a corresponding method 800 for the wireless device 50, shown in FIG. 8. For example, the method 800 includes switching from an active RRC state to an inactive RRC state (block 802), and after said switching, retaining a physical layer configuration corresponding to the BWP active just prior to said switching (block 804).

The physical layer configuration may be a dedicated physical layer configuration corresponding uniquely to the BWP active just prior to said switching, among the two or more previously configured BWPs. The retaining may include retaining a dedicated physical layer configuration for each of two or more of the previously configured BWPs, including the BWP active just prior to said switching.

In some embodiments, the physical layer configuration is a common physical layer configuration corresponding to two or more of the previously configured BWPs, including the BWP active just prior to said switching.

The method 800 may include, upon subsequently returning to the active RRC state, using the physical layer configuration corresponding to the BWP active just prior to said switching. The method 800 may also include, while in the inactive RRC state, after said switching, monitoring for system information and/or paging, using the physical layer configuration corresponding to the BWP active just prior to said switching. The method 800 may then include, while in the inactive RRC state, using the physical layer configuration corresponding to the BWP active just prior to said switching for making a random access attempt. The method 800 may further include, upon failure of the random access attempt, discarding the retained physical layer configuration corresponding to the BWP active just prior to said switching and reverting to an initial BWP for a subsequent random access attempt.

In some embodiments, any of the using of the physical layer configuration corresponding to the BWP active just prior to said switching is conditioned upon not receiving, while in the inactive state, system information (SI) indicating a change in the dedicated physical layer configuration for the BWP active just prior to said switching.

In some cases, the retaining may be responsive to receiving, from a wireless network node, an indication to keep the physical layer configuration corresponding to the BWP. The wireless device may change cells from a source cell to a target cell, while in the inactive RRC state, and wherein the indication is received from a network node operating the target cell. In other cases, the wireless device may change cells from a source cell to a target cell, while in the inactive RRC state, and wherein the indication is received from a network node operating the source cell. The indication may be received in a RRC suspend message.

The physical layer configuration corresponding to the BWP active just prior to said switching may include parameters relating to any one or more of the following: channel-state information (CSI) reporting; interference measurement reporting; and sounding reference signal (SRS) configuration.

Figure 9:
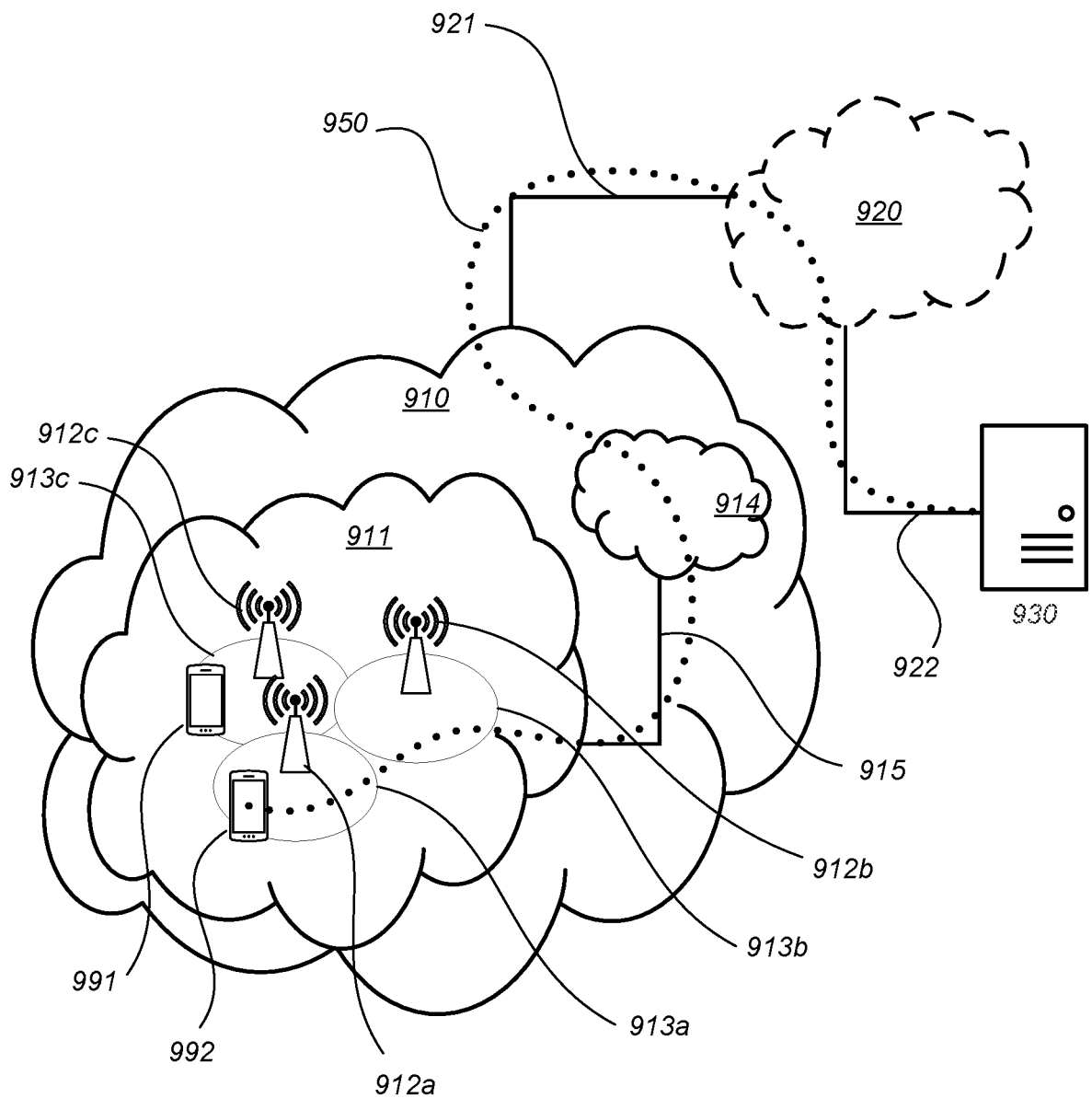
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
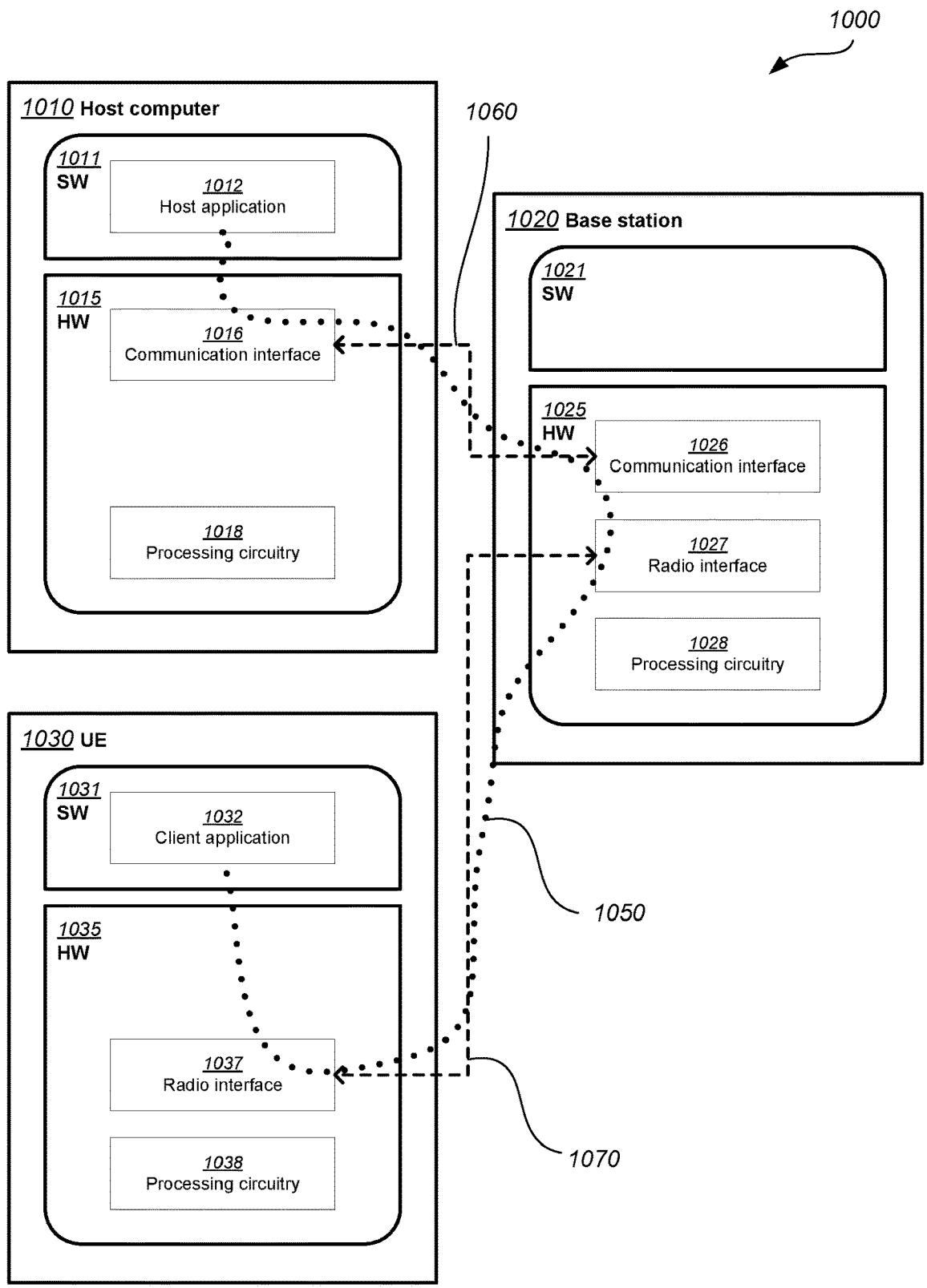
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1330 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as wireless device 50 and network node 30, along with the corresponding methods 600 and 800. A problem is that each time the UE enters either Idle or Inactive state, the UE discards the dedicated BWP configurations. This means all BWP configurations sent via the RRC signaling to the UE will be discarded. The advantage of the embodiments is that the dedicated BWP configuration signaling may be avoided each time the UE re-enters Connected mode. This improves the UE transition time and the data rate, capacity, latency and/or power consumption for the network and UE 1030 using the OTT connection 1050 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
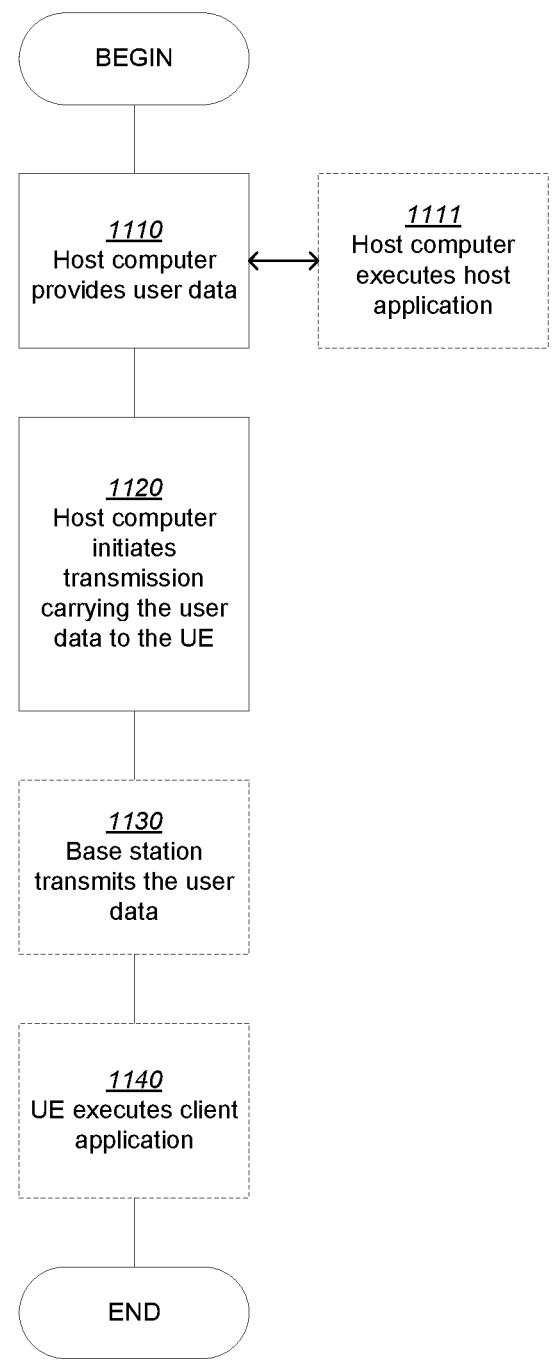
FIGS. 11 to 14 are flowcharts illustrating example methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
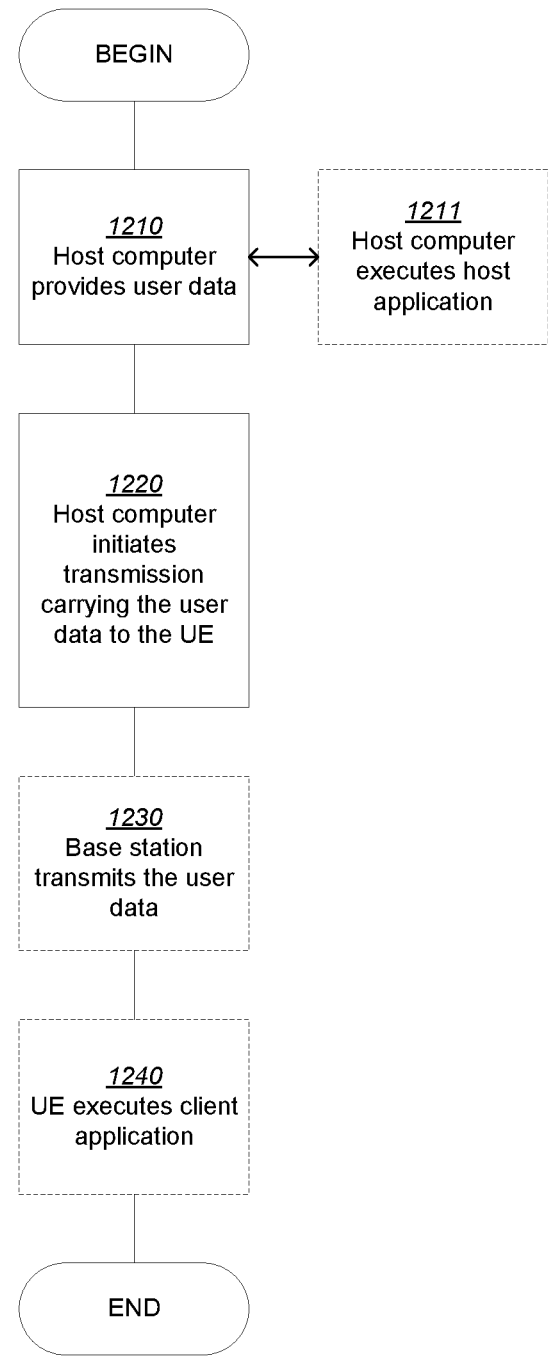

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figure 13:
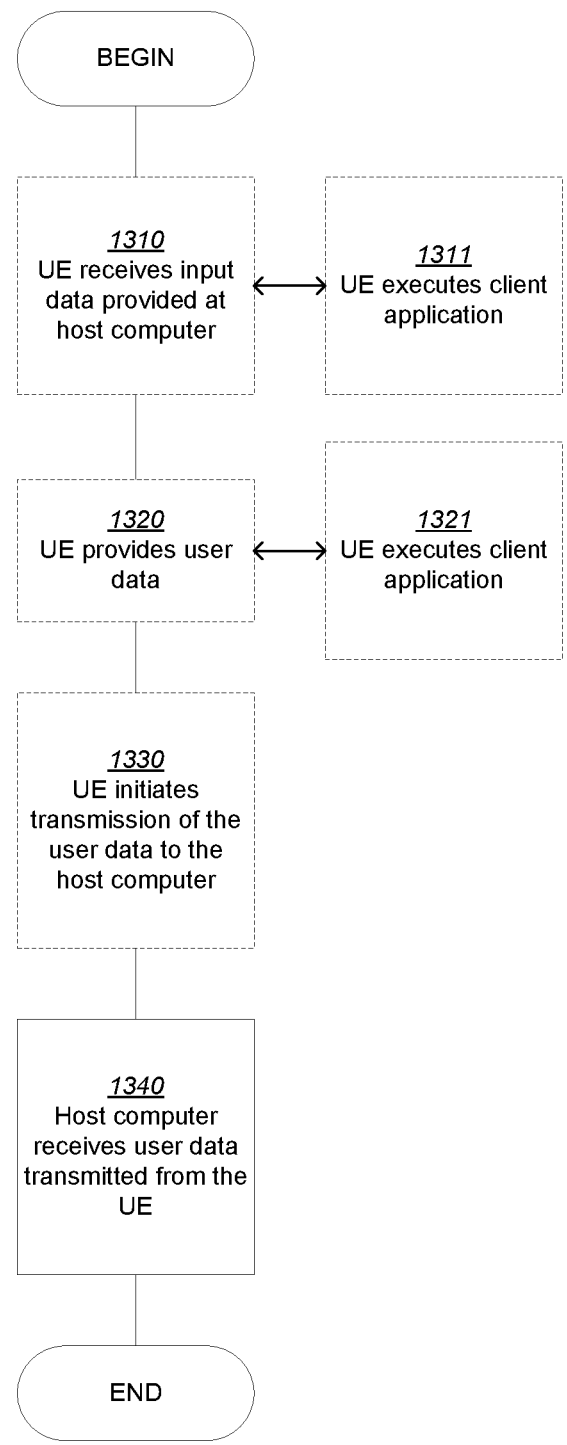

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

Figure 14:
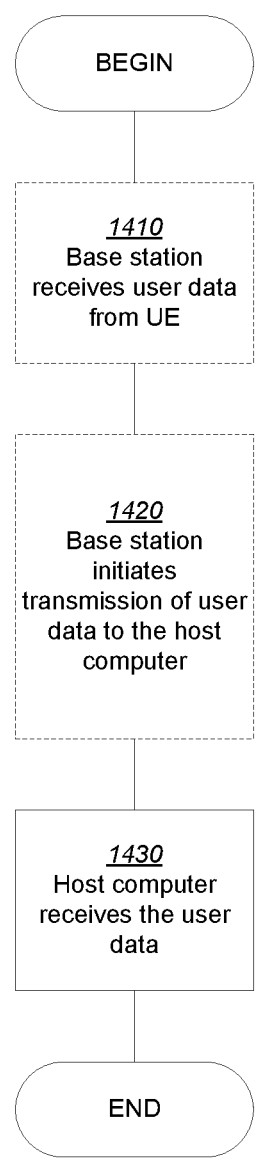

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

According to some embodiments, a communication system including a host computer comprises processing circuitry configured to provide user data and a communication interface configured to forward the user data to a cellular network for transmission to a UE configured to selectively operate in one of two or more previously configured BWPs, each BWP being a different subset of an available bandwidth for uplink and/or downlink operation. The cellular network comprises a base station configured to serve the UE and configured to send, to at least one wireless device, an indication to retain, upon switching from an active RRC state to an inactive RRC state, a physical layer configuration corresponding to a BWP in use by the wireless device just prior to said switching. The communication system may comprise the base station and/or the UE, where the UE is configured to communicate with the base station. The processing circuitry of the host computer may be configured to execute a host application, thereby providing the user data, and the UE may comprise processing circuitry configured to execute a client application associated with the host application.

According to some embodiments, a method implemented in a communication system including a host computer, a base station and a UE configured to selectively operate in one of two or more previously configured BWPs, each BWP being a different subset of an available bandwidth for uplink and/or downlink operation, comprises, at the host computer, providing user data and initiating a transmission carrying the user data to the UE via a cellular network comprising the base station, configured to serve the UE, where the method at the base station comprises sending, to at least one wireless device, an indication to retain, upon switching from an active RRC state to an inactive RRC state, a physical layer configuration corresponding to a BWP in use by the wireless device just prior to said switching. The method may comprise, at the base station, transmitting the user data. The user data may be provided at the host computer by executing a host application, the method further comprising, at the UE, executing a client application associated with the host application.

According to some embodiments, a communication system including a host computer comprises processing circuitry configured to provide user data and a communication interface configured to forward user data to a cellular network for transmission to a UE configured to selectively operate in one of two or more previously configured BWPs, each BWP being a different subset of an available bandwidth for uplink and/or downlink operation, where the UE comprises a radio interface and processing circuitry configured to switch from an active RRC state to an inactive RRC state, and after said switching, retain a physical layer configuration corresponding to the BWP active just prior to said switching. The communication system may further include the UE, and the cellular network may further include a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system including a host computer, a base station and a UE configured to selectively operate in one of two or more previously configured BWPs, each BWP being a different subset of an available bandwidth for uplink and/or downlink operation, comprises, at the host computer, providing user data and initiating a transmission carrying the user data to the UE via a cellular network comprising the base station. The method comprises, at the UE, switching from an active RRC state to an inactive RRC state and after said switching, retaining a physical layer configuration corresponding to the BWP active just prior to said switching. The method may further comprise, at the UE, receiving the user data from the base station.

According to some embodiments, a communication system including a host computer comprises a communication interface configured to receive user data originating from a transmission from a UE to a base station, the UE configured to selectively operate in one of two or more previously configured BWPs, each BWP being a different subset of an available bandwidth for uplink and/or downlink operation. The UE's processing circuitry is configured to switch from an active RRC state to an inactive RRC state and after said switching, retain a physical layer configuration corresponding to the BWP active just prior to said switching. The communication system may further include the UE. The communication system may further include the base station, where the base station comprises a radio interface configured to communicate with the UE and a communication interface configured to forward to the host computer the user data carried by a transmission from the UE to the base station. The processing circuitry of the host computer may be configured to execute a host application; and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE configured to selectively operate in one of two or more previously configured BWPs, each BWP being a different subset of an available bandwidth for uplink and/or downlink operation, comprises switching from an active RRC state to an inactive RRC state, and after said switching, retaining a physical layer configuration corresponding to the BWP active just prior to said switching. The method may further comprise providing user data and forwarding the user data to a host computer via the transmission to the base station.

According to some embodiments, a method implemented in a communication system including a host computer, a base station and a UE configured to selectively operate in one of two or more previously configured BWPs, each BWP being a different subset of an available bandwidth for uplink and/or downlink operation, comprises, at the host computer, receiving user data transmitted to the base station from the UE. The method comprises, at the UE, switching from an active RRC state to an inactive RRC state and after said switching, retaining a physical layer configuration corresponding to the BWP active just prior to said switching. The method may further comprise, at the UE, providing the user data to the base station. The method may further comprise, at the UE, executing a client application, thereby providing the user data to be transmitted, and at the host computer, executing a host application associated with the client application. The method may further comprise, at the UE, executing a client application, and at the UE, receiving input data to the client application, the input data being provided at the host computer by executing a host application associated with the client application. The user data to be transmitted is provided by the client application in response to the input data.

According to some embodiments, a communication system includes a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation. The base station comprises a radio interface and processing circuitry configured to send, to at least one wireless device, an indication to retain, upon switching from an active RRC state to an inactive RRC state, a physical layer configuration corresponding to a BWP in use by the wireless device just prior to said switching. The communication system may further include the base station. The communication system may further include the UE, where the UE is configured to communicate with the base station. The processing circuitry of the host computer may be configured to execute a host application. The UE may be configured to execute a client application associated with the host application, thereby providing the user data to be received by the host computer.

According to some embodiments, a method implemented in a communication system including a host computer, a base station and a UE configured to selectively operate in one of two or more previously configured BWPs, each BWP being a different subset of an available bandwidth for uplink and/or downlink operation, comprises, at the host computer, receiving, from the base station, user data originating from a transmission which the base station has received from the UE. The method at the UE comprises switching from an active RRC state to an inactive RRC state and after said switching, retaining a physical layer configuration corresponding to the BWP active just prior to said switching. The method may further comprise, at the base station, receiving the user data from the UE. The method may further comprise, at the base station, initiating a transmission of the received user data to the host computer.

As discussed in detail above, the techniques described herein, e.g., as illustrated in the process flow diagrams of FIGS. 6 and 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
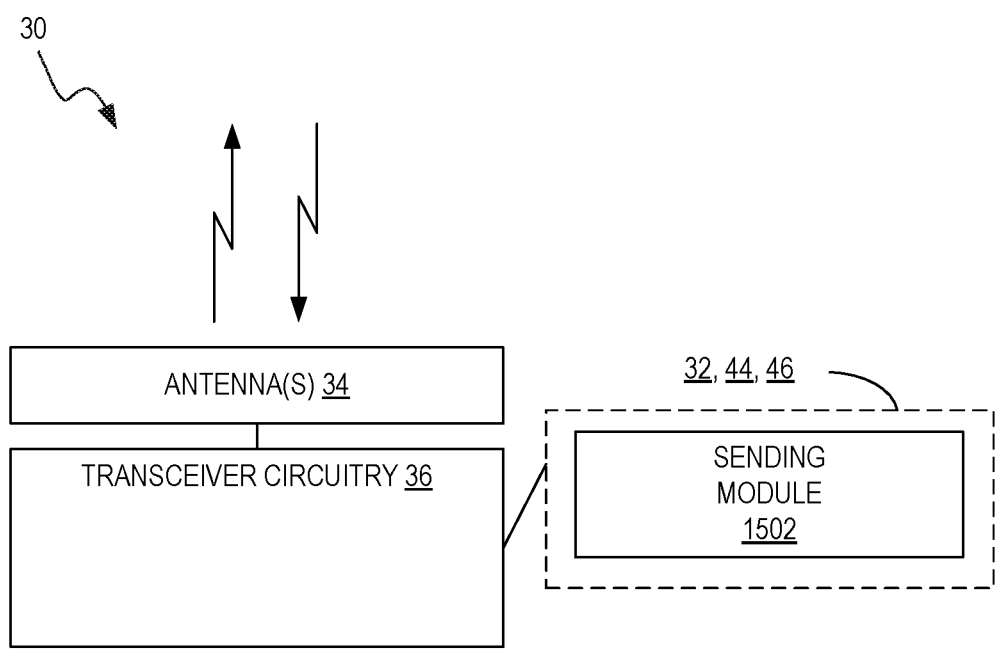
FIG. 15 is a block diagram illustrating a functional implementation of a network node, according to some embodiments.

FIG. 15 illustrates an example functional module or circuit architecture as may be implemented in the network node 30. The functional implementation includes a sending module 1502 for sending, to at least one wireless device, an indication to retain, upon switching from an active RRC state to an inactive RRC state, a physical layer configuration corresponding to a BWP in use by the wireless device just prior to said switching.

Figure 16:
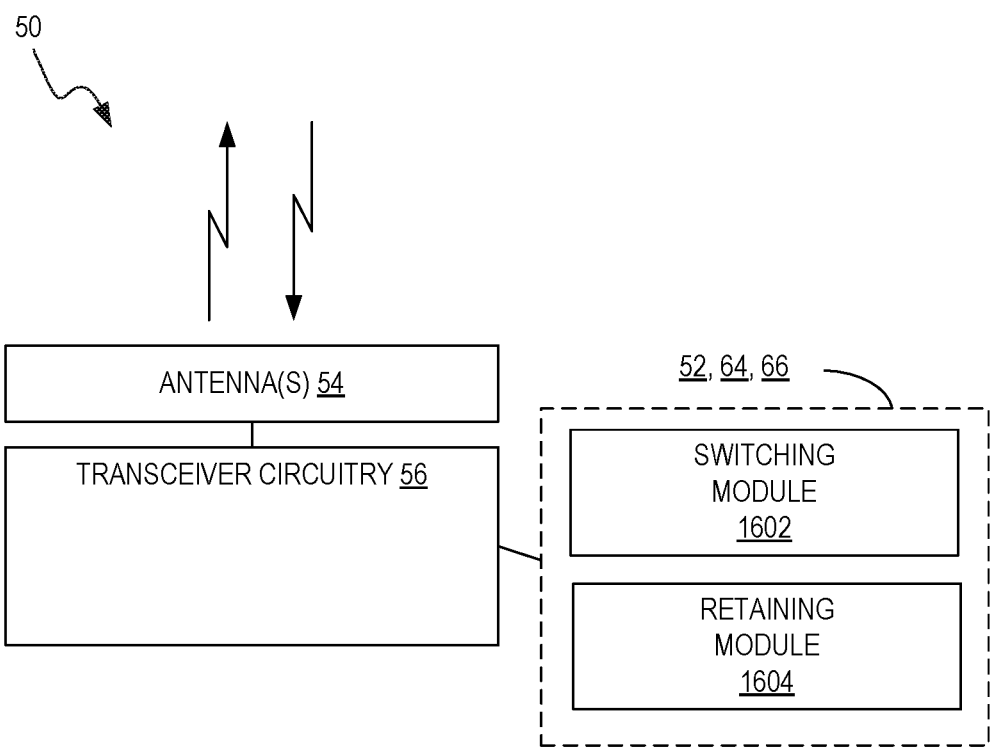
FIG. 16 is a block diagram illustrating a functional implementation of a wireless device, according to some embodiments.

FIG. 16 illustrates an example functional module or circuit architecture as may be implemented in the wireless device 50. The implementation includes a switching module 1602 for switching from an active RRC state to an inactive RRC state. The implementation also includes a retaining module 1604 for, after said switching, retaining a physical layer configuration corresponding to the BWP active just prior to said switching.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, in a wireless device configured to selectively operate in one of two or more previously configured bandwidth parts (BWPs), each BWP being a different subset of an available bandwidth for uplink and/or downlink operation, the method comprising:
   switching from an active Radio Resource Control (RRC) state to an inactive RRC state; and
   after said switching, retaining a physical layer configuration corresponding to the BWP active just prior to said switching.

2. The method of claim 1, wherein the physical layer configuration is a dedicated physical layer configuration corresponding uniquely to the BWP active just prior to said switching, among the two or more previously configured BWPs, and wherein said retaining comprises retaining a dedicated physical layer configuration for each of two or more of the previously configured bandwidth parts, including the BWP active just prior to said switching.

3. The method of claim 1, wherein the physical layer configuration is a common physical layer configuration corresponding to two or more of the previously configured BWPs, including the BWP active just prior to said switching.

4. The method of claim 1, further comprising:
   upon subsequently returning to the active RRC state, using the physical layer configuration corresponding to the BWP active just prior to said switching.

5. The method of claim 1, further comprising:
   while in the inactive RRC state, after said switching, monitoring for system information and/or paging, using the physical layer configuration corresponding to the BWP active just prior to said switching.

6. The method of claim 1, wherein the wireless device changes cells from a source cell to a target cell, while in the inactive RRC state, and wherein said retaining is responsive to receiving, from a wireless network node operating the target cell, an indication to keep the physical layer configuration corresponding to the BWP.

7. A method, in a network node serving a wireless device configured to selectively operate in one of two or more previously configured bandwidth parts (BWPs), each BWP being a different subset of an available bandwidth for uplink and/or downlink operation, the method comprising:
sending, to the wireless device, an indication to retain, upon switching from an active Radio Resource Configuration (RRC) state to an inactive RRC state, a physical layer configuration corresponding to a BWP in use by the wireless device just prior to said switching.

8. The method of claim 7, the method further comprising:
sending to the wireless device, after said sending the indication to retain, one or more updates to the physical layer configuration corresponding to the BWP in use by the wireless device just prior to said switching.

9. A wireless device configured to selectively operate in one of two or more previously configured bandwidth parts (BWPs), each BWP being a different subset of an available bandwidth for uplink and/or downlink operation, the wireless device comprising:
transceiver circuitry configured for communicating with a network node of a wireless communication network; and
processing circuitry operatively associated with the transceiver circuitry and configured to:
switch from an active Radio Resource Control (RRC) state to an inactive RRC state; and
after said switching, retain a physical layer configuration corresponding to the BWP active just prior to said switching.

10. The wireless device of claim 9, wherein the physical layer configuration is a dedicated physical layer configuration corresponding uniquely to the BWP active just prior to said switching, among the two or more previously configured BWPs.

11. The wireless device of claim 10, wherein the processing circuitry is configured to retain the physical layer configuration by retaining a dedicated physical layer configuration for each of two or more of the previously configured BWPs, including the BWP active just prior to said switching.

12. The wireless device of claim 9, wherein the physical layer configuration is a common physical layer configuration corresponding to two or more of the previously configured BWPs, including the BWP active just prior to said switching.

13. The wireless device of claim 9, wherein the processing circuitry is configured to:
upon subsequently returning to the active RRC state, use the physical layer configuration corresponding to the BWP active just prior to said switching.

14. The wireless device of claim 13, wherein said use of the physical layer configuration corresponding to the BWP active just prior to said switching is conditioned upon not receiving, while in the inactive state, system information (SI) indicating a change in the dedicated physical layer configuration for the BWP active just prior to said switching.

15. The wireless device of claim 9, wherein the processing circuitry is configured to:
while in the inactive RRC state, after said switching, monitor for system information and/or paging, using the physical layer configuration corresponding to the BWP active just prior to said switching.

16. The wireless device of claim 14, wherein the processing circuitry is configured to:
while in the inactive RRC state, use the physical layer configuration corresponding to the BWP active just prior to said switching for making a random access attempt.

17. The wireless device of claim 15, wherein the processing circuitry is configured to:
upon failure of the random access attempt, discard the retained physical layer configuration corresponding to the BWP active just prior to said switching and revert to an initial BWP for a subsequent random access attempt.

18. The wireless device of claim 9, wherein the processing circuitry is configured to perform said retaining responsive to receiving, from a wireless network node, an indication to keep the physical layer configuration corresponding to the BWP.

19. The wireless device of claim 18, wherein the wireless device changes cells from a source cell to a target cell, while in the inactive RRC state, and wherein the indication is received from a network node operating the target cell.

20. The wireless device of claim 18, wherein the wireless device changes cells from a source cell to a target cell, while in the inactive RRC state, and wherein the indication is received from a network node operating the source cell.

21. The wireless device of claim 18, wherein said indication is received in an RRC suspend message.

22. The wireless device of claim 9, wherein the physical layer configuration corresponding to the BWP active just prior to said switching comprises parameters relating to any one or more of the following:
channel-state information (CSI) reporting;
interference measurement reporting; and
sounding reference signal, SRS, configuration.

23. A network node configured to serve a wireless device configured to selectively operate in one of two or more previously configured bandwidth parts (BWPs), each BWP being a different subset of an available bandwidth for uplink and/or downlink operation, the network node comprising:
transceiver circuitry configured for communicating with the wireless device; and
processing circuitry operatively associated with the transceiver circuitry and configured to:
send, to the wireless device, an indication to retain, upon switching from an active Radio Resource Configuration (RRC) state to an inactive RRC state, a physical layer configuration corresponding to a BWP in use by the wireless device just prior to said switching.

24. The network node of claim 23, wherein the processing circuitry is configured to perform the sending in conjunction with transitioning the wireless device to the inactive RRC state.

25. The network node of claim 23, wherein the processing circuitry is configured to send the indication via broadcasted system information (SI).

26. The network node of claim 23, wherein the processing circuitry is configured to:
send to the wireless device, after said sending the indication to retain, one or more updates to the physical layer configuration corresponding to the BWP in use by the wireless device just prior to said switching.

* * * * *